April 6, 1965     G. H. W. DOBBERTIN     3,176,733
SAW CHAINS
Filed May 13, 1963     2 Sheets-Sheet 1
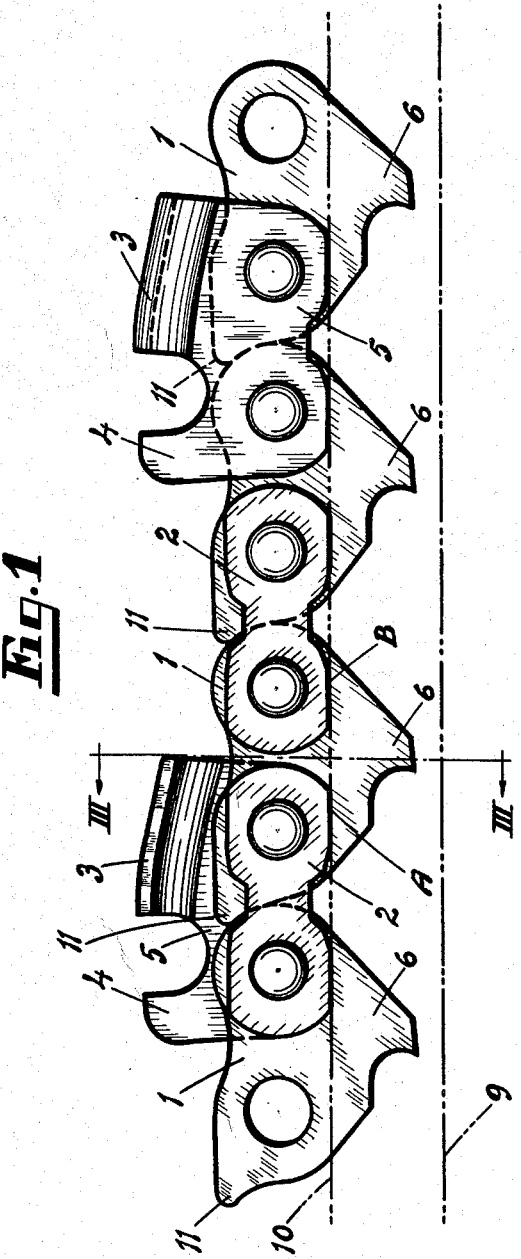
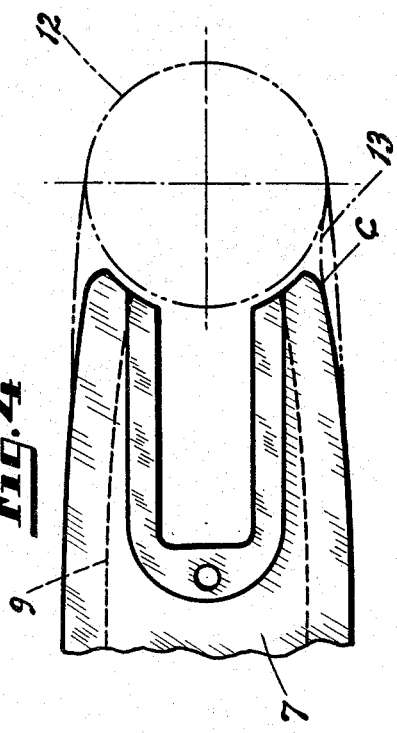
INVENTOR
GUNTHER HEINRICH WILHELM DOBBERTIN
BY *Linton and Linton*
ATTORNEYS April 6, 1965 G. H. W. DOBBERTIN 3,176,733
SAW CHAINS
Filed May 13, 1963 2 Sheets-Sheet 2
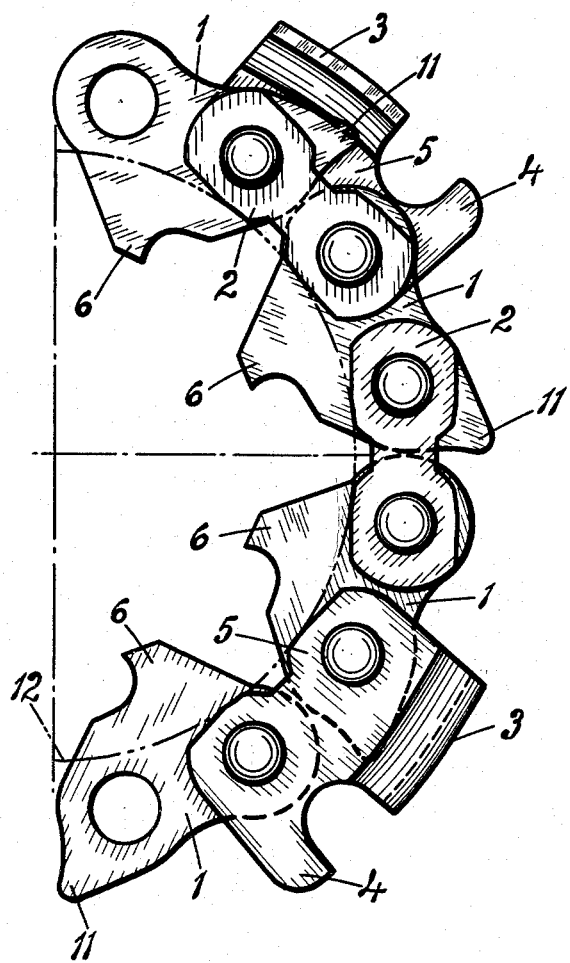
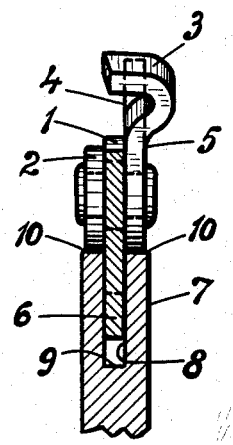
INVENTOR
GUNTHER HEINRICH WILHELM DOBBERTIN 3,176,733
SAW CHAINS
Gunther Heinrich Wilhelm Dobbertin, Goteborg, Sweden, assignor to Aktiebolaget Partner, Gunnebogatan, Molndal, Sweden
Filed May 13, 1963, Ser. No. 279,757
2 Claims. (Cl. 143—135)

The present invention relates to saw chains for power operated chain saws of the kind provided with a saw bar around the periphery of which the saw chain is running. A saw chain for this type of chain saw comprises center links and connecting side links, the center links being provided with portions projecting into a groove extending around the periphery of the saw bar, and the side links, some of which are provided with cutter teeth, slide on the edge portions of the saw bar periphery on opposite sides of said groove.

The object of the invention is to provide a saw chain of the kind mentioned above in which chain wear and saw bar wear are greatly reduced. According to the invention the center links are provided at their front edges with a projection positioned to contact the rear edge of the adjacent center link in stretched condition of the chain.

One embodiment of the invention will be described herebelow with reference to the accompanying drawings wherein:

FIG. 1 is a side view of a portion of a saw chain made in accordance with the invention;

FIG. 2 is a view from the other side illustrating the bending on the saw chain during passage around a pulley provided at the outer end of a saw bar;

FIG. 3 is a cross section through the chain taken on the line III—III in FIG. 1; and FIG. 4 is a side view to a larger scale of the outer end portion of a saw bar.

The saw chain shown in the drawings is composed by a number of center links 1 which are pivotally interconnected in a manner known per se by means of pairs of connecting side links. Alternate pairs of side links consist of identical links 2 and alternate pairs consist of one side link 2 and a side link 5 provided with a cutter tooth 3 and a supporting finger 4 disposed in front of the cutter tooth. The center links 1 are provided with driving teeth 6 which, when the chain is positioned around a saw bar 7 (see FIG. 3), are situated in a groove 8 provided in the edge of the saw bar and which are intended to engage a driving sprocket (not shown in the drawings) which is arranged in conventional manner at one end of the saw bar. The driving teeth 6 are adapted to run in the groove 8 at a distance from the bottom 9 thereof, and the side links 2, 5 slide along the edge portions 10 of the saw bar situated on opposite sides of the groove 8. The positions of the groove bottom 9 and the edge portions 10 of the saw bar relative to the chain are indicated by means of broken lines in FIG. 1.

At the front end of each of the center links 1 (the direction of travel of the chain is from right to left in FIG. 1 and clockwise in FIG. 2) there is provided a forwardly extending projection 11 which, in the stretched condition of the chain illustrated in FIG. 1, contacts the rear end of the adjacent center link. In this manner there will be formed, between each center link 1 and the side links 2, 2 or 2, 5, respectively, situated in front thereof, an elbow joint which will limit the relative pivoting movement between said links in a direction away from the saw bar to the position shown in FIGURE 1.

In previously known saw chains the force acting upon each cutter tooth during operation of the saw causes the rear portion of the cutter tooth link and associated side link to bear heavily against the edge portions 10 of the saw bar. In the saw chain according to the invention this force, due to the action of the elbow joint described above, will be transmitted via the center link 1 situated nearest behind the cutter tooth link 5 to the front portion of the following side links 2. The contact pressure between the chain and the saw bar caused by said force will thus be moved from the point indicated at A to the point indicated at B in FIGURE 1, so that the wear of the saw chain will be greatly reduced. When passing around the drive sprocket disposed at one end of the saw bar as well as when passing around the pulley 12 (indicated in broken lines in FIGURE 4) provided at the opposite end of the saw bar, the chain tends, when leaving the sprocket or pulley, respectively, to bend inwardly towards the saw bar, as indicated in FIGURE 4 by the broken line 13, due to friction in the pivots of the chain. In previously known saw chains this causes the chain to heavily bear against the point of the saw bar indicated at C in FIGURE 4 with consequent heavy wear. Since the projections 11 which according to the invention are provided on the center links 1 restrict the pivoting ability of the chain to alternate pivots this inwardly bending action will be reduced to a certain extent thereby reducing wear.

There are further advantages gained from the projections 11 on the center links. In such sawing operations where the free end of the saw bar is pushed into the wood, a vibrating movement in longitudinal direction of the saw bar is generated in previously known saw chains due to the distance between a cutter tooth 3 and the nearest following support finger 4 when the chain passes around the pulley 12 (see FIG. 2). In a saw chain made in accordance with the invention, however, the projections 11 of the center links 1 disposed between the cutter tooth links 3 will serve as extra support fingers which by contacting the bottom of the saw groove will considerably reduce the vibrating movement.

The invention is not limited to the embodiment hereinbefore described and as shown in the accompanying drawings, said embodiment being susceptible of various modifications with respect to its details without departing from the spirit of the invention.

What I claim is:

1. A saw chain comprising center links and connecting side links interconnecting said center link, cutter teeth being provided on some of said side links, each center link being provided at its front end with a projection extending forwardly in the direction of movement of the chain and positioned to contact the rear end of the adjacent center link in the stretched condition of the chain.

2. A saw chain for power operated saws of the kind comprising a saw bar with a groove extending around the periphery thereof, said saw chain comprising center links having portions projecting into said saw bar groove and side links interconnecting said center links and having their lower edge in sliding contact with the edge portions of the saw bar situated on opposite sides of said groove, cutter teeth being provided on some of said side links, and each center link having a projection extending forwardly thereof in the direction of movement of the chain and positioned to abut against the rear edge of the adjacent center link when said links are positioned along a straight line relative to one another.

References Cited by the Examiner
UNITED STATES PATENTS
2,725,083   11/53   Ackley.
2,924,110   2/60   Gudmundsen.

WILLIAM W. DYER, Jr., Primary Examiner.
DONALD R. SCHRAN, Examiner.